(12) United States Patent
Thalman et al.

(10) Patent No.: US 11,623,686 B1
(45) Date of Patent: Apr. 11, 2023

(54) DETERMINING BIAS OF VEHICLE AXLES

(71) Applicant: Zoox, Inc., Foster City, CA (US)

(72) Inventors: Jacob Patrick Thalman, Menlo Park, CA (US); Genie Kim, Seoul (KR); Joseph Funke, Redwood City, CA (US); Zachary Stuart Churukian, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 591 days.

(21) Appl. No.: 16/709,263

(22) Filed: Dec. 10, 2019

(51) Int. Cl.
| | |
|---|---|
| *B62D 6/00* | (2006.01) |
| *G01S 13/58* | (2006.01) |
| *G01S 19/42* | (2010.01) |
| *G01S 13/06* | (2006.01) |
| *G01S 13/88* | (2006.01) |
| *G01S 19/52* | (2010.01) |

(52) U.S. Cl.
CPC ............. *B62D 6/005* (2013.01); *G01S 13/06* (2013.01); *G01S 13/58* (2013.01); *G01S 13/88* (2013.01); *G01S 19/42* (2013.01); *G01S 19/52* (2013.01)

(58) Field of Classification Search
CPC ......... B62D 6/005; G01S 13/06; G01S 13/58; G01S 13/88; G01S 19/42; G01S 19/52
See application file for complete search history.

(56) References Cited

U.S. PATENT DOCUMENTS

| | | | | |
|---|---|---|---|---|
| 5,825,286 | A * | 10/1998 | Coulthard | G07C 5/008 340/447 |
| 10,395,444 | B1 * | 8/2019 | Edren | G07C 5/0808 |
| 10,488,172 | B1 * | 11/2019 | Funke | B62D 6/04 |
| 10,759,416 | B1 * | 9/2020 | Funke | B60T 8/17554 |
| 2006/0229782 | A1 * | 10/2006 | Deng | B62D 6/003 180/443 |
| 2010/0131229 | A1 * | 5/2010 | Nardi | B60T 8/172 702/142 |
| 2011/0202238 | A1 * | 8/2011 | Cebon | B62D 13/00 701/41 |
| 2012/0065842 | A1 * | 3/2012 | Ghoneim | B62D 7/159 701/42 |
| 2014/0229071 | A1 * | 8/2014 | Kang | B60W 10/12 701/42 |
| 2015/0210318 | A1 * | 7/2015 | Takeda | B62D 6/008 701/41 |
| 2017/0190355 | A1 * | 7/2017 | Ghoneim | G07C 5/0841 |
| 2019/0063913 | A1 * | 2/2019 | Leone | G01M 17/06 |

* cited by examiner

*Primary Examiner* — Daniel L Greene
(74) *Attorney, Agent, or Firm* — Lee & Hayes, P.C.

(57) ABSTRACT

Techniques for diagnosing and disambiguating a bias in one or more axels of a bidirectional four-wheel drive vehicle. In some examples, the diagnostics system may diagnose and disambiguate the bias in the two axles by collecting data related to the movement of the vehicle while the vehicle traverses a zero curvature path in a forward direction. The diagnostics system may then determine a bias in an axle acting as the rear axle based on the collected data. The bias in the axle acting as the front axle may then be determined based on the collected data and the bias in the rear axle.

20 Claims, 5 Drawing Sheets

US 11,623,686 B1

DETERMINING BIAS OF VEHICLE AXLES

BACKGROUND

Wheel and axle alignment of a vehicle is important to ensure that the vehicle is aligned from front to back when driving, especially in the context of autonomous systems. Typically, a diagnostic to determine bias of a misaligned axle and, if required, axle alignment is performed as part of the manufacturing and assembly process. However, in some situations, factory diagnostic systems may be inadequate or unavailable, such as in vehicles with replaceable drive assemblies, or vehicles with four-wheel bidirectional steering. Further, environmental factors may cause misalignment which impacts control of such a vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
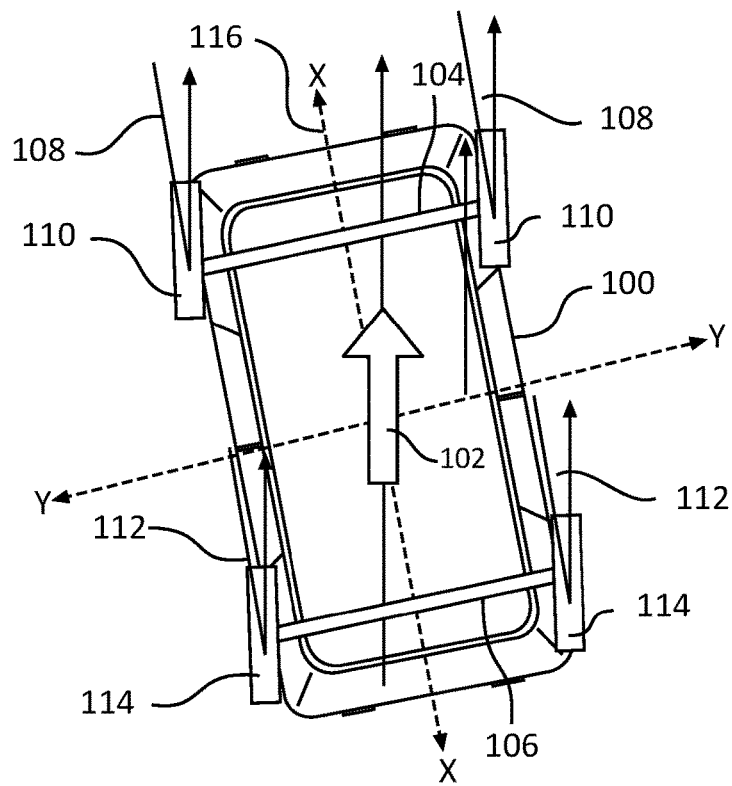
FIG. 1A is a schematic overhead view of an example vehicle maneuvering in the first direction along a zero curvature path with a misalignment in one or more axles, as described herein.

Techniques described herein are directed to a system and process for diagnosing and disambiguating misalignment in one or more axles of a vehicle having four-wheel bidirectional steering. For example, the vehicle may be configured to operate with equal performance characteristics in multiple directions. In some cases, the vehicle may have a first end (e.g., a "north" end) that is the front end of the vehicle when the vehicle is traveling in a first direction and the rear end when traveling in the opposite, second direction. Similarly, a second end (e.g., the "south" end) of the vehicle, opposite the first end, may be the front end of the vehicle when the vehicle is traveling in the second direction and the rear end of the vehicle when the vehicle is traveling in the opposite, first direction. Thus, as discussed herein, it should be understood that "north" and "south" are conventions used to denote the two ends of the vehicle and do not have a relation to compass directions. These example characteristics may facilitate greater maneuverability, for example, in small spaces or crowded environments, such as parking lots and urban areas. However, traditional axle diagnostic and alignment processes used for unidirectional vehicles having a designated front and rear end may result in undetected misalignment of the axles when the vehicle is equipped with four-wheel bidirectional steering (e.g., a vehicle that may operate with two different front ends), as discussed herein.

Additionally, the vehicle, discussed herein, may be composed of a relatively few number of assemblies that may be replaced after assembly. For example, the vehicle may include two drive assemblies, one on each end of the vehicle, that may be detachable and replaceable during and after assembly. In replacement situations, diagnosis of a misalignment of the axle of the newly installed drive assembly may be performed outside of the manufacturing and assembly process. Thus, traditional axle misalignment diagnostic processes may be unavailable.

In some examples, the axle misalignment diagnostic process discussed herein may not only be suitable for vehicles having four-wheel bidirectional steering and for diagnostics outside of the assembly process, but also for operational diagnostics during normal operations. For instance, the axle misalignment diagnostic processes may be used to detect tire, wheel, steering, or axle issues that may develop over time as a result of normal wear and tear, or alternatively, as a result of the vehicle being involved in an accident.

In one example, a longitudinal axis X of the vehicle may be aligned from the north end of the vehicle to the south end of the vehicle (e.g., the two ends that may act as the front of the vehicle during operations). In the discussion below, the north end is considered the positive direction, however, it should be understood that the processes and system may be performed in reverse with the south end being the positive direction, as the vehicle may operate with either end as the front. In some implementations, the axle misalignment diagnostic processes may be configured to determine a bias in the axles of each end of the vehicle, herein referred to as the north axle and the south axle, which correspond to the north end and south end of the vehicle. In some cases, it should be understood that a vehicle may have independent suspension for each wheel. In the case of independent suspension cases, as used herein, the "north axle" may refer to both axles at the first end of the vehicle, and the "south axle" may refer to both axles at the second end of the vehicle.

Initially, during the axle misalignment diagnostic process, the north steering controls may be engaged and the south steering controls may be disabled or provided with a zero command angle. The vehicle may be driven in the north direction (e.g., a forward direction) along a zero curvature path or trajectory (e.g., straight line trajectory). In this situation, the actual angle of the wheels of the north axle ($\theta_a^N$) should equal the actual angle of the wheels of the south axle ($\theta_a^S$) and, thus, the commanded angle of the wheels of the north axle ($\theta_c^N$) plus a steering bias of the north axle ($\beta^N$) equals the commanded angle of the wheels of the south axle ($\theta_c^S$) plus a steering bias of the south axle ($\beta^S$), which may be represented as follows:

$$\theta_a^N = \theta_a^S$$
$$\theta_a^N = \theta_c^N + \beta^N$$
$$\theta_a^S = \theta_c^S + \beta^S$$
$$\theta_c^N + \beta^N = \theta_c^S + \beta^S$$

In this example, since the south steering controls are either disabled or provided with a zero command angle, the commanded angle of the wheels of the south axle is equal to zero and, thus, the actual angle of the wheels of the north axle are equal to steering bias of the south axle, e.g.,:

$$\theta_c^N + \beta^N = \theta_a^N = \beta^S$$

In some cases, the vehicle may be equipped with one or more sensor systems placed on a vehicle to collect data related to the movement, angles, direction, and/or slope of the vehicle. For instance, the vehicle may be equipped with one or more of Global Positioning System (GPS) sensors (which may include Navigation Satellite System (GNSS) antennas, GNSS receivers, GPS antennas and receivers, GLONASS antennas and receivers, GALILEO antennas and receivers, BEIDOU antennas and receivers, as well as other satellite systems antennas and receivers). In some cases, the sensor package systems may also include internal measurement units (IMU), accelerometers, gyroscopes, magnetometers, or a combination thereof.

As the vehicle is traveling in the north direction along the zero curvature path, the GPS sensors may collect data usable to determine a longitudinal velocity, $V_X$, a lateral velocity, $V_Y$, and a yaw, $\psi$. Of course, when cardinal directions are used herein, such directions don't necessarily need to conform to global cardinal directions, but only to differentiate portions of the vehicle. As such, and as detailed below, it is possible to determine wheel biases based on a rotation from an intended orientation of the vehicle and a measured orientation (e.g., using a differential GPS). Using this notation, the longitudinal velocity, $V_{X'}$, and the lateral velocity, $V_{Y'}$, may be estimated relative to a frame of the vehicle having a longitudinal axis X from north to south based at least in part on the following equation:

$$\begin{bmatrix} \cos(\psi_{GPS}) & \sin(\psi_{GPS}) \\ -\sin(\psi_{GPS}) & \cos(\psi_{GPS}) \end{bmatrix} \begin{bmatrix} V_X \\ V_Y \end{bmatrix} = \begin{bmatrix} V_{X'} \\ V_{Y'} \end{bmatrix}$$

In such examples where the GPS measurement is output with respect to a global coordinate system, an additional rotation may be determined. For instance, as the vehicle is traveling in the north direction (e.g., positive direction in this example) along the zero curvature path, if the vehicle is not misaligned (e.g., not crabbing) than lateral velocity, $V_{Y'}$ should be equal to zero. However, if velocity in the lateral velocity, $V_{Y'}$, is not zero than there is a steering bias in the south (e.g., "rear") axle and an offset or error in the yaw, $e_\psi$, is present. In addition, to the error in the yaw, the GPS may also include a measurable yaw, $\psi_{GPS}$, such that the yaw on a straight trajectory, $\psi_{straight}$, may be represented as follows:

$$\psi_{straight} = \psi_{GPS} + e_\psi$$

The error in the yaw, $e_\psi$, may be varied until the lateral velocity, $V_{Y'}$, is minimized (e.g., reduced below a velocity threshold). For example, straight trajectory, $\psi_{straight}$, may be calculated using the variable error in the yaw and substituted into the velocity equation:

$$\begin{bmatrix} \cos(\psi_{GPS}) & \sin(\psi_{GPS}) \\ -\sin(\psi_{GPS}) & \cos(\psi_{GPS}) \end{bmatrix} \begin{bmatrix} V_X \\ V_Y \end{bmatrix} = \begin{bmatrix} V_{X'} \\ V_{Y'} \end{bmatrix}$$

to solve for the lateral velocity, $V_{Y'}$, for each value of offset or error in the yaw, $e_{104}$.

Once the error in yaw is determined, the axle misalignment diagnostic process may determine the bias in the south, $\beta^S$. As discussed above, $\theta_a^N = \beta^S$ and the error in the yaw, $e_\psi$, are approximately equal to the bias in the south axle, $\beta^S$, plus an error (or bias in the measured yaw) from the GPS signal, $e_{GPS}$. The error in the GPS signal, $e_{GPS}$, is known or can be obtained by testing the GPS sensor and the error of the yaw may be represented as follows:

$$e_{104} = \beta^S + e_{GPS}$$

The yaw may also be estimated independently of the GPS yaw, $\psi_{GPS}$, using the position values generated by the GPS, $\psi_{PE}$. For example, $\psi_{PE}$ may be estimated as follows:

$$\psi_{PE} = \arctan\left(\frac{\Delta y}{\Delta x}\right)$$

The yaw of the GPS, $\psi_{GPS}$, and the yaw estimated by the position values generated by the GPS, $\psi_{PE}$, may be represented with respect to a ground truth yaw, $\psi_{GT}$, as follows:

$$\psi_{GPS} = \psi_{GT} + e_{GPS}$$

$$\psi_{PE} = \psi_{GT} + \beta^S$$

The bias in the south (e.g., "rear") axle may then be determined by combining the above equations for $e_{104}$, $\psi_{GPS}$, and $\psi_{PE}$ as follows:

$$e_\psi + \psi_{PE} - \psi_{GPS} = (\beta^S + e_{GPS}) + (\psi_{GT} + \beta^S) - (\psi_{GT} + e_{GPS})$$

$$e_\psi + \psi_{PE} - \psi_{GPS} = 2(\beta^S)$$

$$\beta^S = \frac{1}{2}(e_\psi + \psi_{PE} - \psi_{GPS})$$

Once the bias in the south, $\beta^S$, is determined the axle misalignment diagnostic processes may then determine the bias in the north, $\beta^N$, using the following equations:

$$\theta_c^N + \beta^N = \theta_a^N = \beta^S$$

$$\beta^N = \theta_c^S + \beta^S - \theta_c^N$$

$$\beta^N = \beta^S - \theta_c^N$$

where $\theta_c^S$ is set to zero and $\theta_c^N$ is known.

Alternatively, in some examples, once the bias in the south, $\beta^S$, is determined, the axle misalignment diagnostic processes may be reapplied in reverse (e.g., the vehicle is driven in the south direction) while the north steering controls may be disabled or provided with a zero command angle to determine a bias in the north, $\beta^N$.

Once the bias in the south, $\Gamma^S$, and the bias in the north, $\Gamma^N$, is determined, the axles may be realigned (e.g., to compensate for the bias in the south and/or the bias in the north) to prevent the vehicle from crabbing. In some cases, the axle misalignment diagnostic processes may be run while the vehicle is in normal operations. For example, a change in the bias to the south or to the north may indicate damage to the axle, uneven tire wear, low air pressure in one or more tires, among others. In this case, the axle misalignment diagnostic processes may provide a notice or warning to service the vehicle, either to a remote system (e.g., a remote teleoperator, a maintenance service, etc.) or the passengers located within the vehicle. In one particular example, any detected biases may be stored and later used by later diagnostic tests to detect drifts or changes in alignment over time.

In some cases, the system discussed herein may be used to correct misalignment of one or more axels of a vehicle as well as to compensate for axel misalignment while driving. In some cases, by detecting and generating a compensation value for a bias in one or both axles of the vehicle, the vehicle may operate with reduce risk of damage and in some cases improving overall safety.

Further, although discussed in the context of performing maneuvers along a zero-curvature path are discussed, the present discussion is not meant to be so limiting. As non-limiting examples, similar techniques may be used when traversing a fixed curvature path, as well as a path having a series of non-uniform curvatures (such as may be calculated by a planning system of a vehicle). In such examples, more complex optimizations may be performed (e.g., non-linear least squares) over a series of measurements to determine the biases in steering angle control for one or more axels.

Figure 1B:
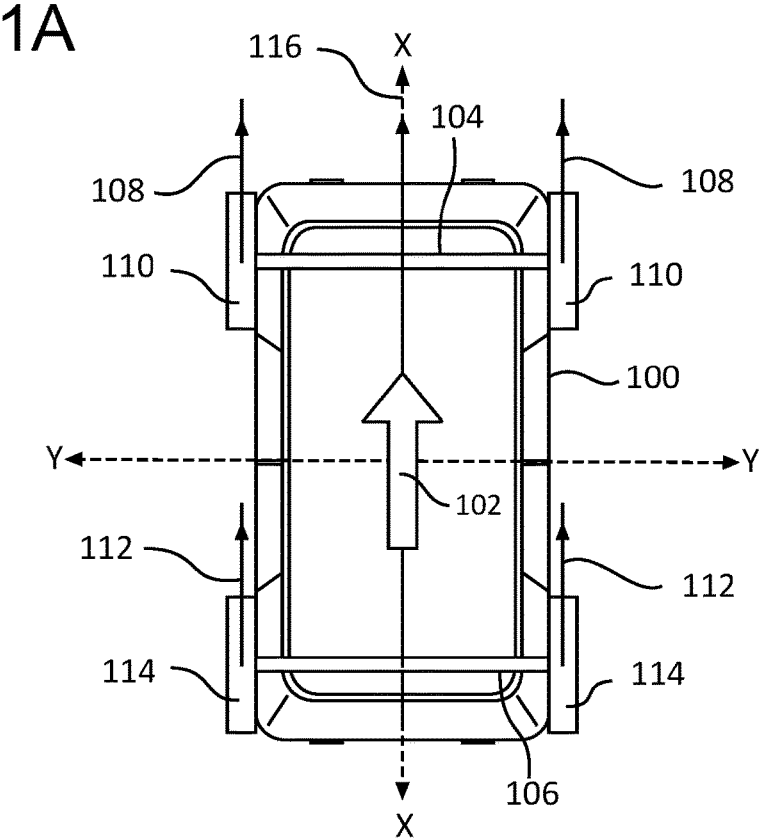
FIG. 1B is a schematic overhead view of an example vehicle maneuvering in the first direction along a zero curvature path with correctly aligned axles, as described herein.

FIG. 1A is a schematic overhead view of an example vehicle 100 maneuvering in the north direction along a zero curvature path 102 with a misalignment in one or more of the axles 104 and 106, as described herein and FIG. 1B is a schematic overhead view of the example vehicle 100 maneuvering in the north direction along a zero curvature path 102 with correctly aligned axles 104 and 106, as described herein. As discussed above and illustrated with respect to FIGS. 1A and 1B, one or more of the axles 104 and 106 of the vehicle 100 may be or may become misaligned. In these cases, prior to realignment the bias in the north axle 104 of the vehicle 100 and the bias in the south axle 106 of the vehicle 100 may be determined.

Initially, a north steering control system may be engaged and the south steering control system may be disabled or provided with a zero command angle. The north steering control system may then receive a command to travel the north direction along a zero curvature path 102 (e.g., straight line trajectory). In this situation, the actual angle 108 of the wheels 110 of the north axle 104 should equal the actual angle 112 of the wheels 114 of the south axle 106 and the north and south ends of the vehicle 100 should be aligned along the longitudinal axis 116, as illustrated in FIG. 1B. However, if a misalignment is present, the vehicle 100 may travel in a straight line along the zero curvature path 102 but the north and south ends of the vehicle 100 will be misaligned along the longitudinal axis 116 of the vehicle 100, thereby, causing the vehicle 100 to "crab", as shown in FIG. 1A. In some alternative cases, the vehicle may receive another known commanded angle to traverse a known curvature path As the vehicle 100 moves in the north direction along the zero curvature path 102, a GPS sensor may collect data associated with two or more positions of the vehicle 100, a yaw of the vehicle, a velocity in the longitudinal direction, and a lateral velocity, as discussed above. In some examples, the vehicle 100 may determine an offset or error in the yaw by estimating various offsets or errors in the yaw and solving the following equations (e.g., by one or more of numeric or symbolic techniques), which, when performed numerically, is iterated until the lateral velocity, $V_Y$, is below a threshold value (which, in at least some examples, be close to zero):

$$\psi_{straight} = \psi_{GPS} + e_\psi$$

$$\begin{bmatrix} \cos(\psi_{GPS}) & \sin(\psi_{GPS}) \\ -\sin(\psi_{GPS}) & \cos(\psi_{GPS}) \end{bmatrix} \begin{bmatrix} V_X \\ V_Y \end{bmatrix} = \begin{bmatrix} V_{X'} \\ V_{Y'} \end{bmatrix}$$

Once the offset or error in the yaw, $e_\psi$, is determined, by minimizing the lateral velocity, $V_Y$, an estimated yaw, $\psi_{PE}$, may be calculated based off of position data collected by the GPS. Thus, offset or error in the yaw is estimated, the yaw reported by the GPS is known, and a yaw may be estimated based on the position data of the GPS. Additionally, an error of the GPS sensor may also be known or determined. The bias in the south axle, $\beta^S$, may then be determined using the following equations, as discussed above:

$$\beta^S = \frac{1}{2}(e_\psi + \psi_{PE} - \psi_{GPS})$$

Once the bias is the south is determined, the bias and the north may be identified using the following:

$$\beta^N = \beta^S - \theta_c^N$$

where $\theta_c^S$ is set to zero and $\theta_c^N$, is the known commanded angle of the north steering control system. The axles may then be realigned or adjusted based on the bias in the north and the bias in the south to cause the vehicle 100 to travel as illustrated in FIG. 1B. As above, such techniques may be applied to more complex paths (e.g., constant curvature or continuously varying curvature paths where such curvatures are known) using similar techniques and solvers.

Figure 2:
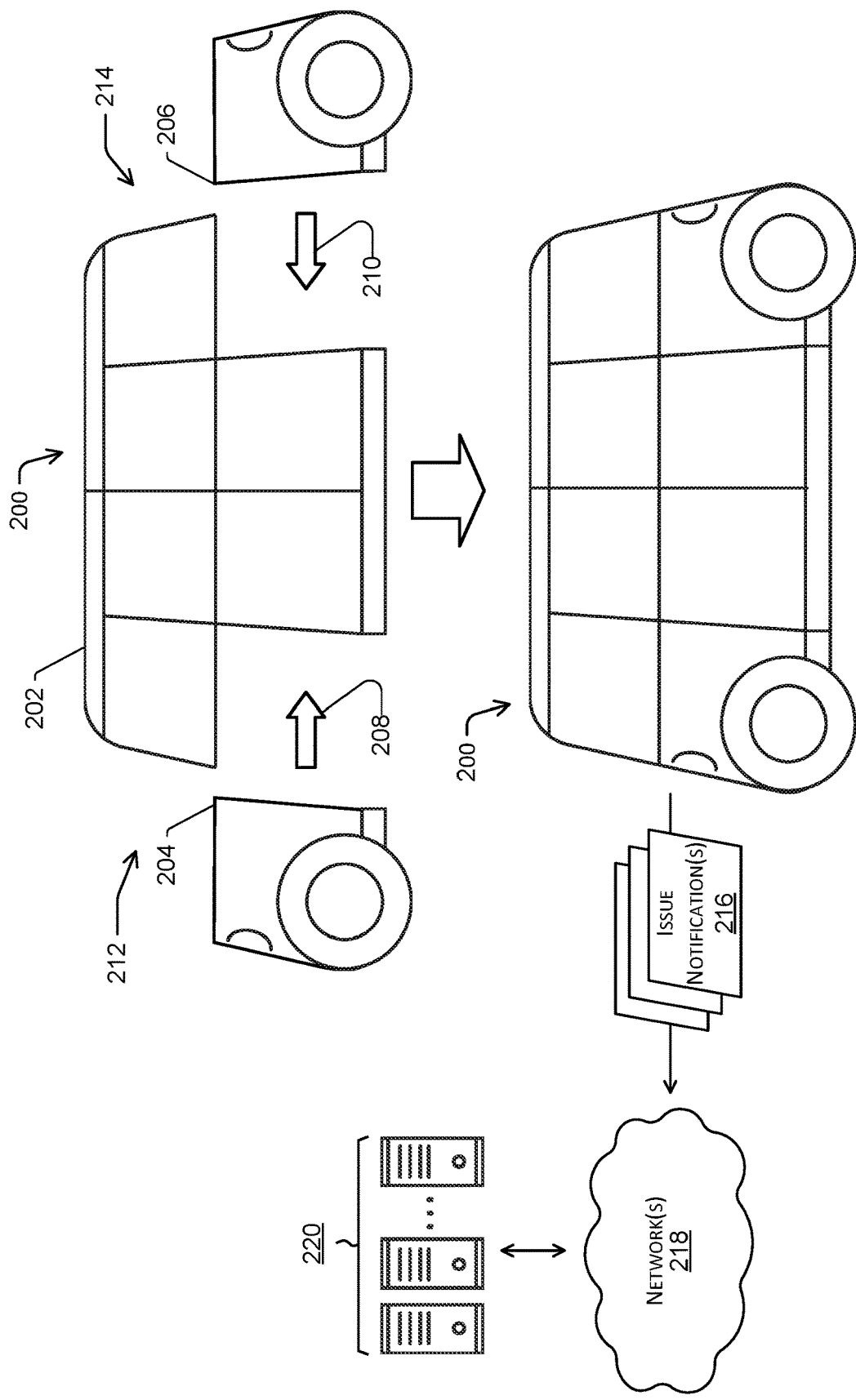
FIG. 2 is a schematic view of an example vehicle comprising a body module and a pair of detachable drive assemblies disposed at opposite ends of the body module, as discussed herein.

FIG. 2 is a schematic view of an example vehicle 200 comprising a body module 202 and a pair of drive assemblies, 204 and 206 respectively, disposed at opposite ends of the body module 202. In particular, the pair of drive assemblies 204 and 206 can, in some examples, can be substantially the same. FIG. 2 illustrates the vehicle 200 in an unassembled state (at the top of the page) and an assembled state (at the bottom of the page).

During installation, either during assembly or as part of a repair or upgrade, the drive assemblies 204 and 206 can be installed by moving them toward the body module 202 in a longitudinal direction of the vehicle 200, as shown by the horizontal arrows 208 and 210. Upon installing the drive assemblies 204 and 206, one or both of the axles may be biased (e.g., incorrectly aligned with the longitudinal axis running from a first end 212 of the vehicle 200 to a second end 214 of the vehicle 200).

As discussed above, the vehicle 200 is bi-directional, and the first drive assembly 204 and the second drive assembly 206 may each include a steering control system. In other words, there is no fixed "front" or "rear" of the vehicle 200. Rather, whichever longitudinal end of the vehicle 200 is leading at the time becomes the "front" and the trailing longitudinal end becomes the "rear." However, to diagnose and disambiguate the bias in either end of the vehicle 200, the vehicle 200 is driven or caused to drive by one of the drive assemblies 204 or 206 along a zero curvature path in one direction, generally referred to as the north or forward direction, while the other drive assembly 204 or 206 is disabled or sent a zero command angle.

As discussed above, a GPS sensor may be used to collect data associated with two or more positions of the vehicle 200, a GPS yaw of the vehicle 200, a longitudinal velocity, and a lateral velocity. An offset or error in the yaw of the vehicle 200 that causes the lateral velocity to fall below a threshold may then be selected and a position yaw may be estimated using the two or more positions of the vehicle 200 reported by the GPS sensor. The bias in the south axle is then calculated based at least in part on the GPS yaw, the offset or error in the yaw, and the estimated position yaw. Once the bias in the south axle is known, the bias in the north axle can be determined using the commanded angle in the forward direction.

In addition to during assembly or when a drive assembly 204 or 206 is replaced or updated, the alignment of the axles may be monitored by the vehicle 200 during normal operations to identify potential issues. For example, if the bias in either axle of the vehicle increases over a threshold value, the detected bias may be an indication of a tire, wheel, axle, or drive assembly issue. Thus, the vehicle 200 may generate an issue notification 216 indicating the detected bias. The issue notification 216 may be presented to the passengers of the vehicle 200 as well as sent, via one or more networks 218, to a remote system 220 in order to alert a remote operator of the potential issue.

In some cases, the axles may be realigned or mechanically adjusted to correct for the bias in either or both of the axles. In these cases, the diagnostics process discussed herein may be reapplied or rerun to determine of the axles are correctly aligned after the mechanical adjustment and/or to use a base line in further testing.

Figure 3:
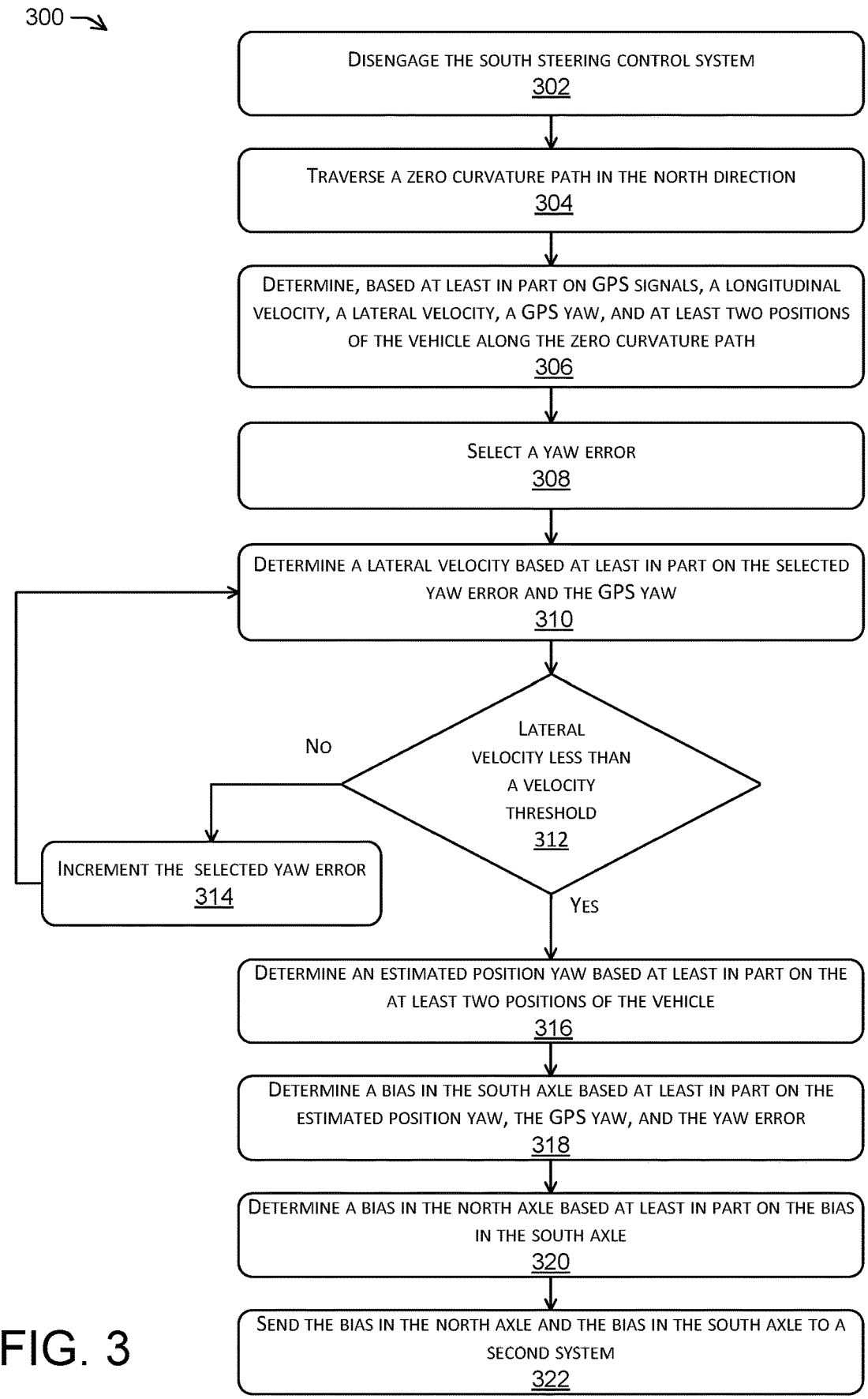
FIG. 3 is a flow diagram illustrating an example process for diagnosing and disambiguating misalignment in axles, as described herein.
Figure 4:
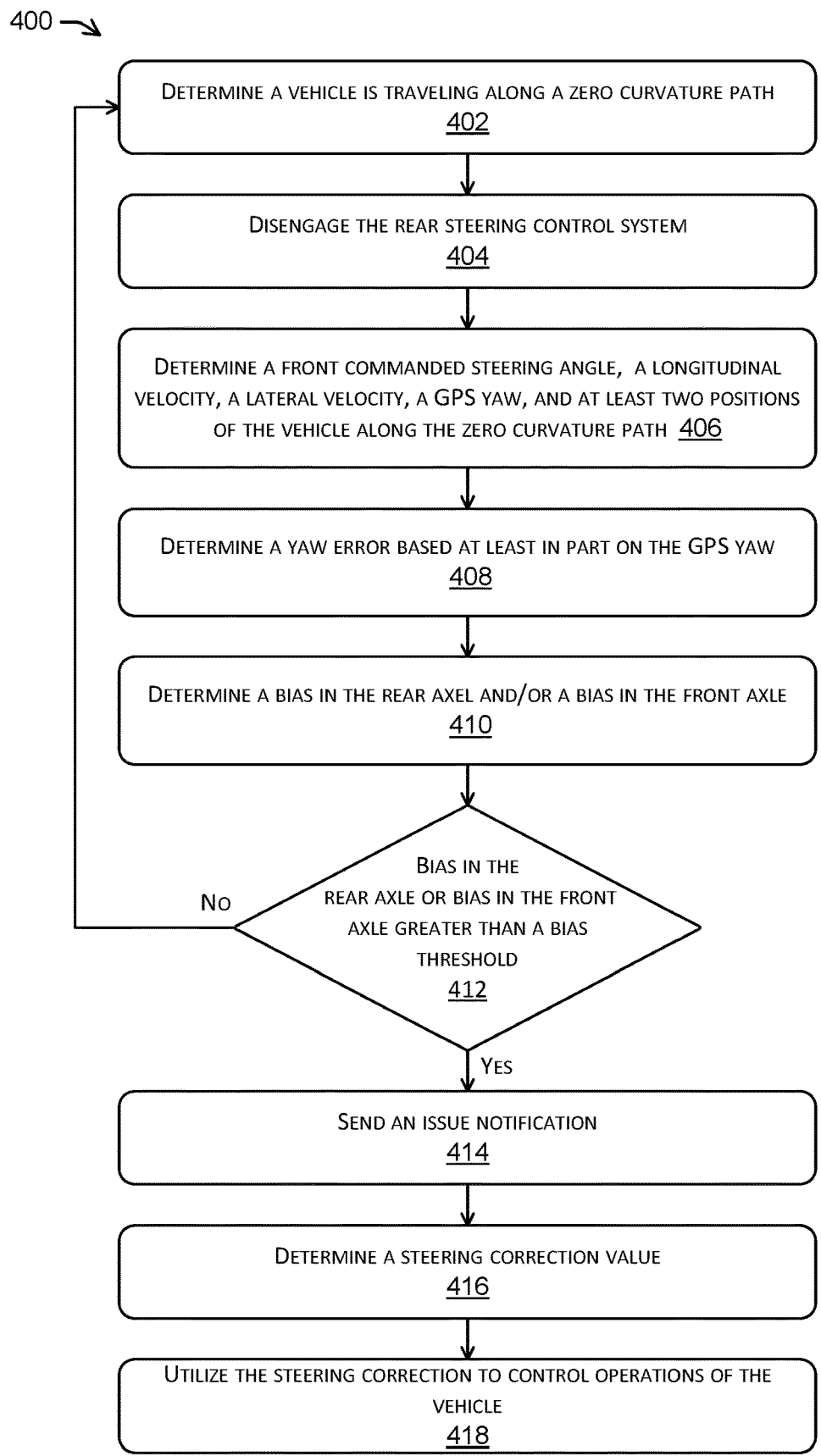
FIG. 4 is a flow diagram illustrating an example process of detecting potential issues associated with the axles or wheels of the vehicle, as described herein.

FIGS. 3 and 4 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 is a flow diagram illustrating an example process 300 for diagnosing and disambiguating misalignment in one or more axles of a vehicle configured for bidirectional control. As discussed above, a vehicle may be configured such that there is no fixed "front" or "rear" end. Rather, the vehicle, discussed herein, may travel with either end as the front and either end as the rear. Each end of the vehicle may also include an independent drive assembly or steering control system.

At 302, a diagnostics component of the vehicle may disengage the south steering control system. In this example, the south steering control system is the steering control system located proximate to the end of the vehicle selected to act as the rear. It should be understood, that either end may be selected as the rear of the vehicle during the diagnosing and disambiguating process 300. In some cases, the disengagement of the south steering control system may include sending a zero command angle to the wheels of the south axle.

At 304, the vehicle may traverse a zero curvature path or trajectory in the north direction. For example, an operator may drive, either via a remote steering apparatus or a steering apparatus on board the vehicle, along the zero curvature path. As the vehicle moves along the zero curvature path, a command angle for the north steering control system is generated by the steering apparatus. In some cases, the vehicle may perform multiple passes along the zero curvature path to allow for additional collection of GPS data and thereby reduce any error in the process 300 introduced by the operator.

At 306, the diagnostics component may determine, based at least in part on received GPS signals, a longitudinal velocity, a lateral velocity, a GPS yaw, and at least two positions (e.g., the start and end positions) of the vehicle along the zero curvature path. A known error or offset of the GPS sensor may also be available or determined prior to starting the process 300.

At 308, the diagnostics component may select a yaw error or offset. For example, the yaw error or offset may be selected based at least in part on the commanded angle to the north steering control system.

At 310, the diagnostics component may determine a lateral velocity based at least in part on a selected yaw error or offset and the GPS yaw. For example, the lateral velocity may be calculated using the following equations:

$$\psi_{straight} = \psi_{GPS} + e_\psi$$

$$\begin{bmatrix} \cos(\psi_{GPS}) & \sin(\psi_{GPS}) \\ -\sin(\psi_{GPS}) & \cos(\psi_{GPS}) \end{bmatrix} \begin{bmatrix} V_X \\ V_Y \end{bmatrix} = \begin{bmatrix} V_{X'} \\ V_{Y'} \end{bmatrix}$$

once the selected yaw error or offset, $e_\psi$, is selected.

At 312, the diagnostics component may determine if the lateral velocity is less than a velocity threshold. If the lateral velocity is not less than the velocity threshold, then the process 300 proceeds to 314 and the selected yaw error is incremented or updated and the lateral velocity is re-calculated using the updated yaw error or offset. In this manner, the yaw error may be increased until, the lateral velocity is brought below the velocity threshold (e.g., the lateral velocity is reduced to a desired level). In some cases, the velocity threshold may be set to zero or a value substantially approximating zero. If the lateral velocity is below the velocity threshold, then the process 300 advances to 316.

At 316, diagnostics component may determine an estimated yaw based at least in part on the at least two positions of the vehicle. Thus, both the GPS yaw reported by the GPS sensor and an estimated yaw determined from the position data reported by the GPS sensor is available. In one specific implementation, the estimated yaw, $\psi_{PE}$, may be determined as follows:

$$\psi_{PE} = \arctan\left(\frac{\Delta y}{\Delta x}\right)$$

At 318, the bias in the south axle may be determined by the diagnostics component based at least in part on the estimated yaw, $\psi_{PE}$, the GPS yaw, $\psi_{GPS}$, and the yaw error or offset, $e_\psi$. For example, given that:

$$e_\psi + \psi_{PE} - \psi_{GPS} = e_\psi + \psi_{PE} - \psi_{GPS}$$

$$e_\psi = \beta^S + e_{GPS}$$

-continued $$\psi_{GPS} = \psi_{GT} + e_{GPS}$$

$$\psi_{PE} = \psi_{GT} + \beta^S$$

than the bias in the south, $\beta^S$, may be determined as follows:

$$e_\psi + \psi_{PE} - \psi_{GPS} = (\beta^S + e_{GPS}) + (\psi_{GT} + \beta^S) - (\psi_{GT} + e_{GPS})$$

$$e_\psi + \psi_{PE} - \psi_{GPS} = 2(\beta^S)$$

$$\beta^S = \frac{1}{2}(e_\psi + \psi_{PE} - \psi_{GPS})$$

where the $e_{GPS}$ is the known.

At 320, the diagnostics component may determine the bias in the north axle, $\beta^N$, based at least in part on the bias in the south axle, $\beta^S$, as follows:

$$\theta_a^N = \theta_a^S$$

$$\theta_a^N = \theta_c^N + \beta^N$$

$$\theta_a^S = \theta_c^S + \beta^S$$

$$\theta_c^N + \beta^N = \theta_c^S + \beta^S$$

$$\theta_c^N + \beta^N = 0 + \beta^S$$

$$\theta_c^N + \beta^N = \beta^S$$

$$\beta^N = \beta^S - \theta_c^N$$

where $\theta_a^N$ represents the actual angle of the wheels of the north axle, $\theta_a^S$ represents the actual angle of the wheels of the south axle, $\theta_c^N$ represents commanded angle of the wheels of the north axle, $\theta_c^S$ represents commanded angle of the wheels of the south axle, and the commanded angle of the wheels of the south is equal to zero.

At 322, the diagnostics component may send or cause the bias in the north axle and the bias in the south axle to be sent to a second system. For example, the diagnostics component may report the bias in the north axle and the bias in the south axle to a remote operator over a network or to a passenger of the vehicle via a display or speaker. In some cases, the diagnostics component may send bias in the north axle and the bias in the south axle to a vehicle maintenance or repair facility. In some examples, the diagnostics component may periodically perform axle alignment diagnostics, such as when the vehicle determines that the vehicle is moving along in a zero curvature path. In these examples, the vehicle may determine an issue exists with respect to the tires, wheels, axles, or steering control systems when the vehicle detects a bias in either axle greater than a bias threshold. In some examples, the vehicle may determine the severity of the issue based on a difference between the bias in either axle and the bias threshold, as discussed below with respect to FIG. 4.

FIG. 4 is a flow diagram illustrating an example process 400 of detecting potential issues associated with the axles or wheels of the vehicle, as described herein. In some cases, the axles, tires, wheels, or steering control systems of the vehicle may cause a misalignment representable as a steering bias in the north or south axle of the vehicle. In these cases, the vehicle may detect the developing bias and alert or notify a vehicle operator, passengers, and/or maintenance personnel of the potential issue.

At 402, a component of the vehicle may determine that the vehicle is traveling along a zero curvature path. For example, the diagnostics component may determine, based on GPS data collected by a GPS sensor of the vehicle or nearby vehicles as well as based on cartographic data of the physical environment and road network, that the vehicle is or will be traversing a zero curvature path for a period of time. In some cases, the period of time may be determined based at least in part on the cartographic data and the known or expected rate of travel of the vehicle.

At 404, the diagnostics component may cause the vehicle to disengage the rear (e.g., south) steering control system, such that the vehicle is operating as a front wheel steering system opposed to a bidirectional steering system for the period of time. For example, the vehicle may disengage the rear steering control system by sending a zero command angle) to the rear steering control system.

At 406, the diagnostics component may determine or receive a front commanded steering angle, a longitudinal velocity, a lateral velocity, a GPS yaw, and at least two positions of the vehicle along the zero curvature path. For example, the front commanded steering angle may be provided by a planning system, a remote operator, or a steering apparatus onboard the vehicle. The longitudinal velocity, a lateral velocity, a GPS yaw, and at least two positions of the vehicle along the zero curvature path may be determined from the GPS data reported by a GPS sensor onboard the vehicle.

At 408, the diagnostics component may determine a yaw error based at least in part on the GPS yaw. For example, as discussed above, the diagnostics component may vary the yaw error or offset until a lateral velocity is reduced below a velocity threshold. Once the lateral direction is reduced below the velocity threshold, then the corresponding yaw error or offset may be selected.

At 410, the diagnostics component may determine a bias in the rear axle and/or a bias in the front axle. For example, as discussed above, once the yaw error, the GPS yaw, and a position yaw calculated using the two or more positions of the vehicle lingo the zero curvature path, are known, the bias in the rear axle may be determined. The bias in the front axle may then be identified using the bias in the rear axle.

At 412, if the diagnostics component determines that either the bias in the rear axle or the bias in the front axle are greater than a bias threshold. If neither the bias in the rear axle nor the bias in the front axle are greater than a bias threshold, the process 400 returns to 402. Otherwise, the process 400 proceeds to 414. For example, the threshold may be stored by the diagnostics component such that each vehicle may be configured to operate within the threshold. In other cases, the threshold may be determined dynamically based for instance on a speed or velocity of the vehicle. For instance, traveling with a bias in either axle over a particular speed may result in increased risk of damage to the vehicle as compared with the vehicle operating under the same bias at a reduced speed.

At 414, the diagnostics component may cause an issue notification to be sent to one or more of a remote operator, a maintenance personnel, or passengers within the vehicle. In some cases, the notification may include a warning to have the vehicle inspected for issues.

At 416, the diagnostics component may determine a steering correction value and, at 418, the vehicle may utilize the steering correction to control operations of the vehicle. For instance, if a bias in the rear axle is identified, the steering correction value may be a value that can be added to the command angles sent to the steering control systems to compensate for the bias in the rear axle, such that the vehicle performs fewer course corrections due to the bias and continues to operate as expected. For instance, one illustrative example, the bias in the rear axle may cause the vehicle to list to the right causing the vehicle to occasionally approach the right side of the lane. In these situations, the vehicle may detect the lane lines and perform a course correction to bring the vehicle back to the center of the lane. However, by utilizing a steering correction value, the vehicle may remain in the center of the lane as the commanded angles compensate for the list in a manner similar to how a human operator would adjust the steering apparatus to compensate for a list.

Figure 5:
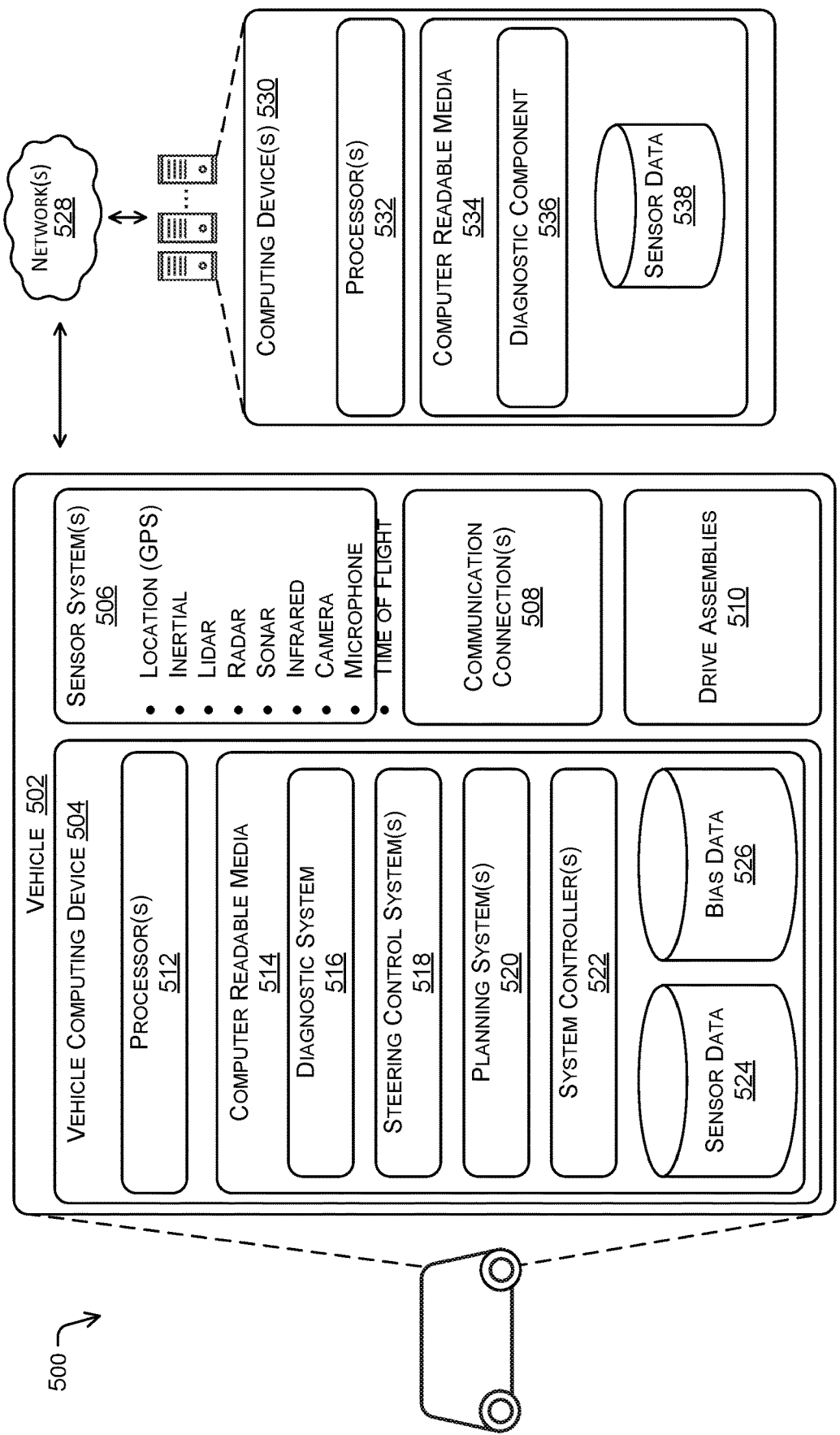
FIG. 5 is a block diagram of an example system for the vehicle axle alignment system, as described herein.

FIG. 5 is a block diagram of an example system 500 for the vehicle axle alignment system, as described herein. In some examples, the system 500 may include one or multiple features, components, and/or functionality of embodiments described herein with reference to FIGS. 1-4. In some embodiments, the system 500 may include a vehicle 502. The vehicle 502 may include a vehicle computing device 504, one or more sensor systems 506, one or more communication connections 508, and one or more drive assemblies 510.

The vehicle computing device 504 may include one or more processors 512 and one or more computer readable media 514 communicatively coupled with the one or more processors 512. In the illustrated example, the vehicle 502 is an autonomous vehicle; however, the vehicle 502 could be any other type of vehicle, or any other system (e.g., a robotic system, a camera enabled smartphone, etc.). In the illustrated example, the computer readable media 514 of the vehicle computing device 504 stores a diagnostic system 516, a steering control system 518, a planning system 520, one or more system controllers 522 as well as sensor data 524, bias data 526. Though depicted in FIG. 5 as residing in computer readable media 514 for illustrative purposes, it is contemplated that the diagnostic system 516, the steering control system 518, the planning system 520, the one or more system controllers 522 as well as the sensor data 524, bias data 526, as well as the other data, may additionally, or alternatively, be accessible to the vehicle 502 (e.g., stored on, or otherwise accessible by, computer readable media remote from the vehicle 502) or associated or stored in computer readable media of other systems, such as the drive assemblies 510.

The diagnostic system 516 may be configured to detect and determine a bias of one or more of the axles of the vehicle 502. For instance, the diagnostic system 516 may designate one end of the bidirectional vehicle as the front end (e.g., north end) and one as the rear end (e.g., south end). The diagnostic system 516 may receive the commanded angles sent to the steering control system 518 and/or the drive assemblies 510 associated with the north end of the vehicle as the vehicle 502 traverses a zero curvature path. The diagnostic system 516 may also receive sensor data 524 (e.g., position and/or GPS data) from the sensor system 506 as the vehicle 502 traverses a zero curvature path. The sensor data 524 may include data associated with positions of the vehicle 502, a GPS yaw of the vehicle, a velocity in the longitudinal direction, and a velocity in the lateral direction (both of which may be determined from a velocity in the north and east directions, as may be provided by the GPS). The diagnostic system 516 may then determine offsets or errors in the yaw by substituting various errors in the yaw, $e_\psi$, and solving the following equations until the velocity in the lateral is below a threshold value:

$$\psi_{straight} = \psi_{GPS} + e_\psi$$

$$\begin{bmatrix} \cos(\psi_{GPS}) & \sin(\psi_{GPS}) \\ -\sin(\psi_{GPS}) & \cos(\psi_{GPS}) \end{bmatrix} \begin{bmatrix} V_X \\ V_Y \end{bmatrix} = \begin{bmatrix} V_{X'} \\ V_{Y'} \end{bmatrix}$$

Once, the diagnostic system 516 identifies the offset or error in the yaw, $e_\psi$, an estimated yaw, $\psi_{PE}$, may be calculated using the position data collected by the GPS sensor. As such, the diagnostic system 516 obtains or determines three yaw values: (1) the error in the yaw, $e_\psi$, (2) the yaw reported by the GPS, $\psi_{GPS}$, and (3) the yaw estimated based on the position data of the GPS, $\psi_{PE}$. Additionally, an error of the GPS sensor may also available to the diagnostic system 516. The diagnostic system 516 may then determine a bias in the south axle using the following equations:

$$\beta^S = \frac{1}{2}(e_\psi + \psi_{PE} - \psi_{GPS})$$

Once the bias is the south is determined, the diagnostic system 516 may determine the bias in the north axle using the following:

$$\beta^N = \beta^S + \theta_c^N$$

where $\theta_c^S$ is set to zero and $\theta_c^N$ is the known commanded angle of the north steering control system 518 and/or the north drive assemblies 510 received from, for instance, the planning system 520.

In one example, the steering control system 518 may be configured to control the angles and direction of the wheels of the vehicle 502 based on commanded angles received from the planning system 520. In some cases, the vehicle 502 may include a first steering control system 518 and a second steering control system 518. Each of the first steering control system 518 and a second steering control system 518 may be associated with one longitudinal end of the vehicle 502, such that the vehicle 502 may be bidirectional (e.g., either end may operate as either the front or rear of the vehicle 502). In some cases, the vehicle 502 having two steering control systems 518 may operate as a four-wheel drive vehicle, a front-wheel drive vehicle, or a rear-wheel drive vehicle. In the illustrated example, the steering control systems 518 are shown as part of the vehicles computing device 504, however, in other examples, the steering control system 518 may be part of the drive assemblies 510 of the vehicle 502.

The planning system 520 may determine a path for the vehicle to follow to traverse through the physical environment. As an example, the planning system 520 may determine various routes and trajectories and various levels of detail. For instance, the planning system 520 may determine a route to travel from a current location to a target location. In some cases, the planning system 520 may determine command angles for the steering control system 518 and/or the drive assemblies 510. For the purpose of this discussion, a route may include a sequence of waypoints for travelling between two locations.

In at least one example, the vehicle computing device 504 can include one or more system controllers 522, which can be configured to control steering, propulsion, braking, safety, emitters, communication, and other systems of the vehicle 502. These system controller(s) 522 may communicate with and/or control corresponding systems of the drive assemblies 510 and/or other components of the vehicle 502.

In some instances, aspects of some or all of the components discussed herein can include any models, algorithms, and/or machine learning algorithms. For example, in some instances, components in the computer readable media 514 (and the computer readable media 534, discussed below) and planning system 520 may be implemented as one or more neural networks.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 506 can include multiple instances of each of these or other types of sensors. For instance, the lidar sensors may include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 may provide input to the vehicle computing device 504. Additionally, or alternatively, the sensor system(s) 506 can send sensor data, via the one or more networks 528, to the one or more computing device(s) 530 at a particular frequency, after a lapse of a predetermined period of time, in near real-time, etc.

The vehicle 502 can also include one or more communication connection(s) 508 that enable communication between the vehicle 502 and one or more other local or remote computing device(s). For instance, the communication connection(s) 508 may facilitate communication with other local computing device(s) on the vehicle 502 and/or the drive assemblies 510. Also, the communication connection(s) 508 may allow the vehicle 502 to communicate with other nearby computing device(s) (e.g., other nearby vehicles, traffic signals, etc.). The communications connection(s) 508 also enable the vehicle 502 to communicate with remote teleoperations computing devices or other remote services.

The communications connection(s) 508 may include physical and/or logical interfaces for connecting the vehicle computing device 504 to another computing device (e.g., computing device(s) 530) and/or a network, such as network(s) 528. For example, the communications connection(s) 508 may enable Wi-Fi based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

As discussed above, in at least one example, the vehicle 502 can include one or more drive assemblies 510. In some examples, the vehicle 502 may have a single drive assemblies 510. In at least one example, if the vehicle 502 has multiple drive assemblies 510, individual drive assemblies 510 can be positioned on opposite ends of the vehicle 502 (e.g., the front and the rear, etc.). In at least one example, the drive assemblies 510 can include one or more sensor systems 506 to detect conditions of the drive assemblies 510 and/or the surroundings of the vehicle 502, as discussed above. By way of example and not limitation, the sensor system(s) 506 can include one or more wheel encoders (e.g., rotary encoders) to sense rotation of the wheels of the drive assemblies 510, inertial sensors (e.g., inertial measurement units, accelerometers, gyroscopes, magnetometers, etc.) to measure orientation and acceleration of the drive assemblies 510, cameras or other image sensors, ultrasonic sensors to acoustically detect objects in the surroundings of the drive assemblies 510, lidar sensors, radar sensors, etc. Some sensors, such as the wheel encoders may be unique to the drive assemblies 510. In some cases, the sensor system(s) 506 on the drive assemblies 510 can overlap or supplement corresponding systems of the vehicle 502.

In at least one example, the components discussed herein can process sensor data 524, as described above, and may send their respective outputs, over the one or more network(s) 528, to one or more computing device(s) 530. In at least one example, the components discussed herein may send their respective outputs to the one or more computing device(s) 530 at a particular frequency, after a lapse of a predetermined period of time, in near real-time, etc.

In some examples, the vehicle 502 can send sensor data to one or more computing device(s) 530 via the network(s) 528. In some examples, the vehicle 502 can send raw sensor data 524 to the computing device(s) 530. In other examples, the vehicle 502 can send processed sensor data 524 and/or representations of sensor data (for instance, the object perception tracks) to the computing device(s) 530. In some examples, the vehicle 502 can send sensor data 524 to the computing device(s) 530 at a particular frequency, after a lapse of a predetermined period of time, in near real-time, etc. In some cases, the vehicle 502 can send sensor data (raw or processed) to the computing device(s) 530 as one or more log files.

The computing device(s) 530 may include processor(s) 532 and computer readable media 534 storing a diagnostic component 536 as well as sensor data 538. The diagnostic component 536 may operate similar to diagnostic system 516 onboard the vehicle 502 to, for instance, identify a bias in either end of the vehicle 502 based on the sensor data 524 and 538.

The processor(s) 512 of the vehicle 502 and the processor(s) 532 of the computing device(s) 530 may be any suitable processor capable of executing instructions to process data and perform operations as described herein. By way of example and not limitation, the processor(s) 512 and 532 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 514 and 534 are examples of non-transitory computer-readable media. The computer readable media 514 and 534 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 5 is illustrated as a distributed system, in alternative examples, components of the vehicle 502 can be associated with the computing device(s) 530 and/or components of the computing device(s) 530 can be associated with the vehicle 502. That is, the vehicle 502 can perform one or more of the functions associated with the computing device(s) 530, and vice versa. Further, aspects of machine learning component 538 can be performed on any of the devices discussed herein.

EXAMPLE CLAUSES

A. A vehicle comprising: one or more processors; and one or more non-transitory computer readable media storing instructions executable by the one or more processors, wherein the instruction, when executed, cause the system to perform operations comprising: a first steerable axle positioned proximate to a first longitudinal end of a vehicle; a second steerable axle positioned proximate to a second longitudinal end of the vehicle, the second longitudinal end of the vehicle being opposite the first longitudinal end of the vehicle; one or more processors; and one or more non-transitory computer readable media storing instructions executable by the one or more processors, wherein the instructions, when executed, cause the vehicle to perform operations comprising: commanding the vehicle to travel along a zero curvature path in a first longitudinal direction; determining a commanded angle of wheels associated with the first steerable axle of the vehicle; receiving sensor data from a sensor associated with the vehicle; determining, based at least in part on the sensor data, a velocity in the first longitudinal direction, a velocity in a lateral direction transverse the first longitudinal direction, and a reported yaw value; determining a yaw error based at least in part on the velocity in the first longitudinal direction, the velocity in a lateral direction, and the reported yaw value; determining a first bias associated with the first steerable axle based at least in part on the yaw error; and determining a second bias associated with the second steerable axle based at least in part on the first bias and the commanded angle of wheels associated with the first steerable axle.

B. The vehicle of paragraph A, wherein the first bias is associated with the second axle is determined based at least in part on the reported yaw value and an estimated yaw determined based on the sensor data.

C. The vehicle of paragraph A, wherein the first bias and the second bias are determined while the vehicle is operating normally.

D. The vehicle of paragraph A, wherein the operations further comprise: commanding the vehicle to travel along a second zero curvature path in a second longitudinal direction, the second longitudinal direction opposite the first longitudinal direction; determining a second commanded angle of wheels associated with the second steerable axle of the vehicle; receiving second sensor data from the sensor associated with the vehicle; determining, based at least in part on the second sensor data, a second velocity in the second longitudinal direction, a second velocity in the lateral direction, and a second reported yaw value; determining a second yaw error based at least in part on the second velocity in the first longitudinal direction, the second velocity in a lateral direction, and the second reported yaw value; determining a third bias associated with the second steerable axle based at least in part on the second yaw error; and determining a fourth bias associated with the first steerable axle based at least in part on the third bias and the second commanded angle.

E. A method comprising: causing a zero angle to be commanded to a steering control associated with a first axle of a vehicle, the first axle positioned proximate to a first longitudinal end of a vehicle; capturing sensor data associated with a sensor of the vehicle while the vehicle is traversing a path, the vehicle including a first axle positioned proximate to a first longitudinal end of a vehicle; determining a first bias associated with the first axle based at least in part on the sensor data; and determining a second bias associated a the second axle based at least in part on the first bias, the second axle positioned proximate to a second longitudinal end of the vehicle, the second longitudinal end opposite the first longitudinal end.

F. The method of paragraph E, further comprising: receiving a commanded angle of wheels associated with a second axle of the vehicle, the second axle positioned proximate to a second longitudinal end of the vehicle and the second longitudinal end of the vehicle opposite the first longitudinal end of the vehicle; and wherein determining the second bias associated with the second axle is based at least in part on the commanded angle of the wheels associated with the second axle.

G. The method of paragraph E, further comprising determining, based at least in part on the sensor data, a velocity in the first direction, a velocity in a second direction perpendicular to the first direction, and a measured yaw value of the vehicle, wherein determining the first bias is further based at least in part on one or more of the velocity in the first direction, the velocity in the second direction perpendicular to the first direction, or the measured yaw value of the vehicle.

H. The method of paragraph E, wherein the path comprises a zero curvature path, the method further comprising: determining a yaw error based at least in part on the velocity in the first direction, the velocity in the second direction, and the measured yaw value; and wherein determining the first bias associated with the first axle is based at least in part on the yaw error.

I. The method of paragraph H, wherein determining the first bias comprises minimizing the velocity in the second direction.

J. The method of paragraph E, wherein the sensor data comprises at least one of image data, lidar data, or radar data.

K. The method of paragraph E, further comprising: determining a difference between one or more of the first bias or the second bias and a stored bias; determining the difference meets or exceeds a first bias threshold; and reducing a velocity of the vehicle in response to determining the difference meets or exceeds the first bias threshold.

L. The method of paragraph K, comprising: determining the difference meets or exceeds a second bias threshold; and causing the vehicle to come to a stop in response to determining the difference meets or exceeds the second bias threshold.

M. The method of paragraph E, wherein causing the zero angle to be commanded to the steering control associated with the first axle comprises disengaging the steering control associated with the first axle.

N. A non-transitory computer-readable medium storing instructions that, when executed, cause one or more processors to perform operations comprising: receiving data associated with a vehicle while the vehicle is traversing a first path; sending a commanded steering angle to a steering controller associated with a first axle of the vehicle, which when received by the steering controller, causes the steering controller to orient wheels associated with the first axle to traverse the first path; determining a first bias associated with a second axle based at least in part on the data; and determining a second bias associated with the first axle based at least in part on the first bias and the commanded angle of the wheels associated with the first axle.

O. The non-transitory computer-readable medium of paragraph N, wherein operations further comprise: receiving second data associated with a vehicle while the vehicle is traversing a second path, the second path in a direction opposite the first path; sending a second commanded steering angle to a second steering controller associated with the second axle acting, which when received by the second steering controller, causes the steering controller to orient second wheels associated with the second axle to traverse a zero-curvature path; determining a third bias associated with a first axle based at least in part on the second data; and determining a fourth bias associated with the first axle based at least in part on the third bias and the second commanded angle.

P. The non-transitory computer-readable medium of paragraph N, wherein operations further comprise: determining the first bias or the second bias differs from a stored bias by at least a threshold; and reducing a velocity of the vehicle below a velocity threshold in response to determining the first bias or the second bias differs from the stored bias by at least the threshold.

Q. The non-transitory computer-readable medium of paragraph N, wherein operations further comprise: determining a steering correction value based at least in part on the first bias or the second bias, the steering correction value to compensate for the first bias or the second bias; and adjusting additional commanded steering angles based at least in part on the steering correction value.

R. The non-transitory computer-readable medium of paragraph N, wherein operations further comprise: determining the first bias or the second bias differs from a second stored threshold by at least a second threshold; and causing the vehicle to come to a stop in response to determining the first bias or the second bias differs from the second stored threshold by at least the second threshold.

S. The non-transitory computer-readable medium of paragraph N, wherein the data associated with the vehicle includes a longitudinal velocity in, a lateral velocity perpendicular to the longitudinal direction, and a measured yaw value of the vehicle.

T. The non-transitory computer-readable medium of paragraph N, wherein determining the second bias is also based at least in part on a second commanded angle of wheels associated with the first axle.

While the example clauses described above are described with respect to one particular implementation, it should be understood that, in the context of this document, the content of the example clauses can also be implemented via a method, device, system, a computer-readable medium, and/or another implementation. Additionally, any of examples A-A-T may be implemented alone or in combination with any other one or more of the examples A-T.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 5 may utilize the processes and flows of FIGS. 1-5.

As a non-limiting example, techniques described herein may be performed, at least in part, by a computing device of an autonomous vehicle, which may receive sensor data and detect one or more objects in an environment and/or determine attributes or object parameters of the one or more objects in the physical environment. Object parameters may comprise velocity, acceleration, position, classification, and/or extents of each of the one or more objects, in addition to any uncertainty information associated therewith. Sensor data captured by the autonomous vehicle may include light detection and ranging (lidar) sensor data, radio detection and ranging (radar) sensor data, sound navigation and ranging (sonar) sensor data, image data, time of flight data, and the like. In some cases, sensor data may be provided to a perception system configured to determine a type of object (e.g., vehicle, pedestrian, bicycle, animal, parked car, tree, building, and the like) in the environment. Further, the out of sequence perception system may determine, based on the sensor data, movement information about the object in the physical environment.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
   a first steerable axle positioned proximate to a first longitudinal end of a vehicle;
   a second steerable axle positioned proximate to a second longitudinal end of the vehicle, the second longitudinal end of the vehicle being opposite the first longitudinal end of the vehicle;
   one or more processors; and
   one or more non-transitory computer readable media storing instructions executable by the one or more processors, wherein the instructions, when executed, cause the vehicle to perform operations comprising:
      commanding the vehicle to travel along a zero curvature path in a first longitudinal direction;
      determining a commanded angle of wheels associated with the first steerable axle of the vehicle;

receiving sensor data from a sensor associated with the vehicle;

determining, based at least in part on the sensor data, a velocity in the first longitudinal direction, a velocity in a lateral direction transverse the first longitudinal direction, and a reported yaw value;

determining a yaw error based at least in part on the velocity in the first longitudinal direction, the velocity in a lateral direction, and the reported yaw value;

determining a first bias associated with the first steerable axle based at least in part on the yaw error; and determining a second bias associated with the second steerable axle based at least in part on the first bias and the commanded angle of wheels associated with the first steerable axle.

2. The vehicle of claim 1, wherein the first bias is associated with the second axle is determined based at least in part on the reported yaw value and an estimated yaw determined based on the sensor data.

3. The vehicle of claim 1, wherein the first bias and the second bias are determined while the vehicle is operating normally.

4. The vehicle of claim 1, wherein the operations further comprise:

commanding the vehicle to travel along a second zero curvature path in a second longitudinal direction, the second longitudinal direction opposite the first longitudinal direction;

determining a second commanded angle of wheels associated with the second steerable axle of the vehicle;

receiving second sensor data from the sensor associated with the vehicle;

determining, based at least in part on the second sensor data, a second velocity in the second longitudinal direction, a second velocity in the lateral direction, and a second reported yaw value;

determining a second yaw error based at least in part on the second velocity in the first longitudinal direction, the second velocity in a lateral direction, and the second reported yaw value;

determining a third bias associated with the second steerable axle based at least in part on the second yaw error; and determining a fourth bias associated with the first steerable axle based at least in part on the third bias and the second commanded angle.

5. A method comprising:

causing a zero angle to be commanded to a steering control associated with a first axle of a vehicle, the first axle positioned proximate to a first longitudinal end of a vehicle;

capturing sensor data associated with a sensor of the vehicle while the vehicle is traversing a path, the vehicle including a first axle positioned proximate to a first longitudinal end of a vehicle;

determining a first bias associated with the first axle based at least in part on the sensor data; and determining a second bias associated with a second axle based at least in part on the first bias, the second axle positioned proximate to a second longitudinal end of the vehicle, the second longitudinal end opposite the first longitudinal end.

6. The method of claim 5, further comprising:

receiving a commanded angle of wheels associated with a second axle of the vehicle, the second axle positioned proximate to a second longitudinal end of the vehicle and the second longitudinal end of the vehicle opposite the first longitudinal end of the vehicle; and wherein determining the second bias associated with the second axle is based at least in part on the commanded angle of the wheels associated with the second axle.

7. The method of claim 5, wherein the sensor data comprises at least one of image data, lidar data, or radar data.

8. The method of claim 5, wherein causing the zero angle to be commanded to the steering control associated with the first axle comprises disengaging the steering control associated with the first axle.

9. The method of claim 5, the method further comprising determining, based at least in part on the sensor data, a velocity in the first direction, a velocity in a second direction perpendicular to the first direction, and a measured yaw value of the vehicle, wherein determining the first bias is further based at least in part on one or more of the velocity in the first direction, the velocity in the second direction perpendicular to the first direction, or the measured yaw value of the vehicle.

10. The method of claim 9, wherein the path comprises a zero curvature path, the method further comprising:

determining a yaw error based at least in part on the velocity in the first direction, the velocity in the second direction, and the measured yaw value; and wherein determining the first bias associated with the first axle is based at least in part on the yaw error.

11. The method of claim 9, wherein determining the first bias comprises minimizing the velocity in the second direction.

12. The method of claim 5, further comprising:

determining a difference between one or more of the first bias or the second bias and a stored bias;

determining the difference meets or exceeds a first bias threshold; and reducing a velocity of the vehicle in response to determining the difference meets or exceeds the first bias threshold.

13. The method of claim 12, further comprising:

determining the difference meets or exceeds a second bias threshold; and causing the vehicle to come to a stop in response to determining the difference meets or exceeds the second bias threshold.

14. One or more non-transitory computer readable media storing instructions executable by one or more processors, wherein the instructions, when executed, cause the one or more processors to perform operations comprising:

receiving data associated with a vehicle while the vehicle is traversing a first path;

sending a commanded steering angle to a steering controller associated with a first axle of the vehicle, which when received by the steering controller, causes the steering controller to orient wheels associated with the first axle to traverse the first path;

determining a first bias associated with a second axle based at least in part on the data; and determining a second bias associated with the first axle based at least in part on the first bias and the commanded angle of the wheels associated with the first axle.

15. The non-transitory computer readable media of claim 14, wherein operations further comprise:

receiving second data associated with a vehicle while the vehicle is traversing a second path, the second path in a direction opposite the first path;

sending a second commanded steering angle to a second steering controller associated with the second axle, which when received by the second steering controller, causes the steering controller to orient second wheels associated with the second axle to traverse a zero-curvature path;

determining a third bias associated with a first axle based at least in part on the second data; and determining a fourth bias associated with the first axle based at least in part on the third bias and the second commanded angle.

16. The non-transitory computer readable media of claim 14, wherein operations further comprise:

determining the first bias or the second bias differs from a stored bias by at least a threshold; and reducing a velocity of the vehicle below a velocity threshold in response to determining the first bias or the second bias differs from the stored bias by at least the threshold.

17. The non-transitory computer readable media of claim 14, wherein operations further comprise:

determining a steering correction value based at least in part on the first bias or the second bias, the steering correction value to compensate for the first bias or the second bias; and adjusting additional commanded steering angles based at least in part on the steering correction value.

18. The non-transitory computer readable media of claim 14, wherein operations further comprise:

determining the first bias or the second bias differs from a second stored threshold by at least a second threshold; and causing the vehicle to come to a stop in response to determining the first bias or the second bias differs from the second stored threshold by at least the second threshold.

19. The non-transitory computer readable media of claim 14, wherein the data associated with the vehicle includes a longitudinal velocity in, a lateral velocity perpendicular to the longitudinal direction, and a measured yaw value of the vehicle.

20. The non-transitory computer-readable medium of claim 14, wherein determining the second bias is also based at least in part on a second commanded angle of wheels associated with the first axle.

* * * * *